US010479420B2

(12) United States Patent
Staser et al.

(10) Patent No.: US 10,479,420 B2
(45) Date of Patent: Nov. 19, 2019

(54) APPARATUS AND METHOD FOR PROVIDING A MOVABLE WINDOW IN A VEHICLE

(71) Applicant: INTEVA PRODUCTS, LLC, Troy, MI (US)

(72) Inventors: Brian H. Staser, Oxford, MI (US); Ashley Simpson, Royal Oak, MI (US); Delia Roland, Detroit, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 94 days.

(21) Appl. No.: 15/800,800

(22) Filed: Nov. 1, 2017

(65) Prior Publication Data

US 2019/0126995 A1    May 2, 2019

(51) Int. Cl.
*B62D 33/06* (2006.01)
*B62D 21/03* (2006.01)
*B60R 13/02* (2006.01)
*B60J 1/18* (2006.01)
*B62D 25/00* (2006.01)

(52) U.S. Cl.
CPC .............. *B62D 33/06* (2013.01); *B60J 1/18* (2013.01); *B60J 1/1861* (2013.01); *B60R 13/02* (2013.01); *B62D 21/03* (2013.01); *B62D 25/00* (2013.01)

(58) Field of Classification Search
CPC ........ B62D 33/06; B62D 25/00; B62D 21/03; B60J 1/1861; B60R 13/02
USPC ........... 296/1.08, 190.08, 190.1, 201, 146.15
See application file for complete search history.

(56) References Cited

U.S. PATENT DOCUMENTS

| | | | | |
|---|---|---|---|---|
| 6,260,916 B1* | 7/2001 | Hunt | ..................... | B62D 33/02 296/146.16 |
| 6,416,104 B1* | 7/2002 | Fisher | .................. | B60N 2/3013 296/190.11 |
| 6,513,863 B1* | 2/2003 | Renke | ..................... | B60J 5/108 296/190.11 |
| 6,550,849 B1* | 4/2003 | Dosdall | ..................... | B60P 3/40 296/146.12 |
| 6,575,515 B2* | 6/2003 | Hashimoto | .......... | B62D 47/003 296/146.11 |
| 6,742,834 B1* | 6/2004 | Merritt | ................. | B60N 2/3011 296/146.2 |
| 6,786,535 B1* | 9/2004 | Grzegorzewski | .... | B60N 2/3013 296/146.16 |

(Continued)

*Primary Examiner* — Jason S Morrow
*Assistant Examiner* — E Turner Hicks
(74) *Attorney, Agent, or Firm* — Cantor Colburn LLP

(57) ABSTRACT

A body frame of a vehicle is provided. The body frame having: a rear wall extending between a pair of pillars of the body frame; a reinforcement beam that is spaced from the rear wall to define a gap and wherein the reinforcement beam extends between the pair of pillars of the body frame; a rear window opening partially defined by the rear wall and the reinforcement beam; and wherein the body frame is configured for use with either a fixed window or a moving window, wherein the fixed window when secured to the body frame is fixedly secured to the reinforcement beam and the rear wall and the fixed window has an overmolding located about a periphery of the fixed window and a bottom portion of the overmolding traverses the gap and wherein the moving window when secured to the body frame moves in the gap.

18 Claims, 12 Drawing Sheets

(56) References Cited

U.S. PATENT DOCUMENTS

| | | | |
|---|---|---|---|
| 6,796,600 B1* | 9/2004 | Ferer | B60J 1/2011 |
| | | | 296/146.1 |
| 8,246,101 B2* | 8/2012 | Cicala | B60J 1/1861 |
| | | | 296/146.16 |
| 9,211,780 B2* | 12/2015 | Lahnala | B60J 1/1861 |
| 2002/0008396 A1* | 1/2002 | De Gaillard | B60J 7/026 |
| | | | 296/26.09 |
| 2005/0052053 A1* | 3/2005 | Rhodes | B60N 2/3011 |
| | | | 296/183.1 |
| 2006/0076801 A1* | 4/2006 | Czirmer | B60J 1/1861 |
| | | | 296/190.11 |

\* cited by examiner

APPARATUS AND METHOD FOR PROVIDING A MOVABLE WINDOW IN A VEHICLE

BACKGROUND

Exemplary embodiments of the present disclosure pertain to the art of movable windows in a vehicle. More particularly, an improved vehicle body that allows for installation of either a fixed or a movable glass window in the same vehicle body without requiring modifications to structural components of the vehicle body is provided.

Some vehicles, in particular pickup trucks, are desired to have a full dropping back glass or rear window. As used herein, dropping back glass refers to a glass panel or window that is capable of being moved from a closed position wherein a window opening is sealed to an open position wherein the window opening is open. In order to facilitate the movement of this glass, a full inner panel is installed in the rear of the pickup truck in similar fashion as a side door. This design adds cost to the truck architecture due to the added sheet metal cost to have the dropping or moving glass. More particularly, this requires two configurations of a body design one for a fixed window and one for a moving window.

Accordingly, it is desirable to provide a single vehicle body architecture that can be used with either a fixed glass window or a moveable glass window and without substantial additional costs when using the single vehicle body architecture with a fixed glass window.

BRIEF DESCRIPTION

In accordance with an embodiment of the disclosure, a body frame of a vehicle is provided. The body frame having: a rear wall extending between a pair of pillars of the body frame; a reinforcement beam that is spaced from the rear wall to define a gap and wherein the reinforcement beam extends between the pair of pillars of the body frame; a rear window opening partially defined by the rear wall and the reinforcement beam; and wherein the body frame is configured for use with either a fixed window or a moving window, wherein the body frame is configured for use with either a fixed window or a moving window, wherein the fixed window when secured to the body frame is fixedly secured to the reinforcement beam and the rear wall and the fixed window has an overmolding located about a periphery of the fixed window and a bottom portion of the overmolding traverses the gap and wherein the moving window when secured to the body frame moves in the gap.

In addition to one or more of the features described above, or as an alternative to any of the foregoing embodiments, the reinforcement beam comprises an inner reinforcement and an outer reinforcement each of which extend between the pillars.

In addition to one or more of the features described above, or as an alternative to any of the foregoing embodiments, wherein the pair of pillars extend along sides of the body frame.

In addition to one or more of the features described above, or as an alternative to any of the foregoing embodiments, the rear window opening may be defined by edges of the rear wall, the pair of pillars and the roof portion.

In addition to one or more of the features described above, or as an alternative to any of the foregoing embodiments, the rear window opening may include a flange that extends along the roof portion proximate to the rear window opening as well as portions of the pair of pillars that form sides of rear window opening.

In addition to one or more of the features described above, or as an alternative to any of the foregoing embodiments, the reinforcement beam does not extend all the way to a floor portion of the body frame.

In addition to one or more of the features described above, or as an alternative to any of the foregoing embodiments, a panel may be secured to the reinforcement beam when the moving window is secured to the body frame.

In addition to one or more of the features described above, or as an alternative to any of the foregoing embodiments, the panel may be a plastic panel that has a window regulator.

In addition to one or more of the features described above, or as an alternative to any of the foregoing embodiments, the window regulator may be secured to an outboard side of the panel, wherein the outboard side of the panel faces the rear wall when the panel is secured to the reinforcement beam.

In addition to one or more of the features described above, or as an alternative to any of the foregoing embodiments, the panel may have a class A surface on an inboard side of the panel, the inboard side of the panel being opposite the outboard side of the panel.

In addition to one or more of the features described above, or as an alternative to any of the foregoing embodiments, the vehicle may be a pickup truck.

In yet another embodiment, a body frame of a vehicle is provided. The body frame having: a rear wall extending between a pair of pillars of the body frame; a reinforcement beam that is spaced from the rear wall to define a gap and wherein the reinforcement beam extends between the pair of pillars of the body frame; a rear window opening partially defined by the rear wall and the reinforcement beam; a panel secured to a lower portion of the reinforcement beam; and a moving window secured to a window regulator of the panel, wherein the moving window moves in the gap as it moves in the rear window opening.

In addition to one or more of the features described above, or as an alternative to any of the foregoing embodiments, the reinforcement beam may have an inner reinforcement and an outer reinforcement each of which extend between the pillars.

In addition to one or more of the features described above, or as an alternative to any of the foregoing embodiments, wherein the pair of pillars extend along sides of the body frame.

In addition to one or more of the features described above, or as an alternative to any of the foregoing embodiments, the rear window opening may be defined by edges of the rear wall, the pair of pillars and the roof portion and wherein the vehicle is a pickup truck.

In addition to one or more of the features described above, or as an alternative to any of the foregoing embodiments, wherein the rear window opening includes a flange that extends along the roof portion proximate to the rear window opening as well as portions of the pair of pillars that form sides of rear window opening.

In addition to one or more of the features described above, or as an alternative to any of the foregoing embodiments, wherein the reinforcement beam does not extend all the way to a floor portion of the body frame.

In addition to one or more of the features described above, or as an alternative to any of the foregoing embodiments, wherein the panel may be a plastic panel that carries the window regulator.

In addition to one or more of the features described above, or as an alternative to any of the foregoing embodiments, wherein the window regulator may be a dual channel window regulator that is secured to an outboard side of the panel.

In addition to one or more of the features described above, or as an alternative to any of the foregoing embodiments, wherein the window regulator is secured to an outboard side of the panel, wherein the outboard side of the panel faces the rear wall when the panel is secured to the reinforcement beam and wherein the panel has a class A surface on an inboard side of the panel, the inboard side of the panel being opposite the outboard side of the panel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
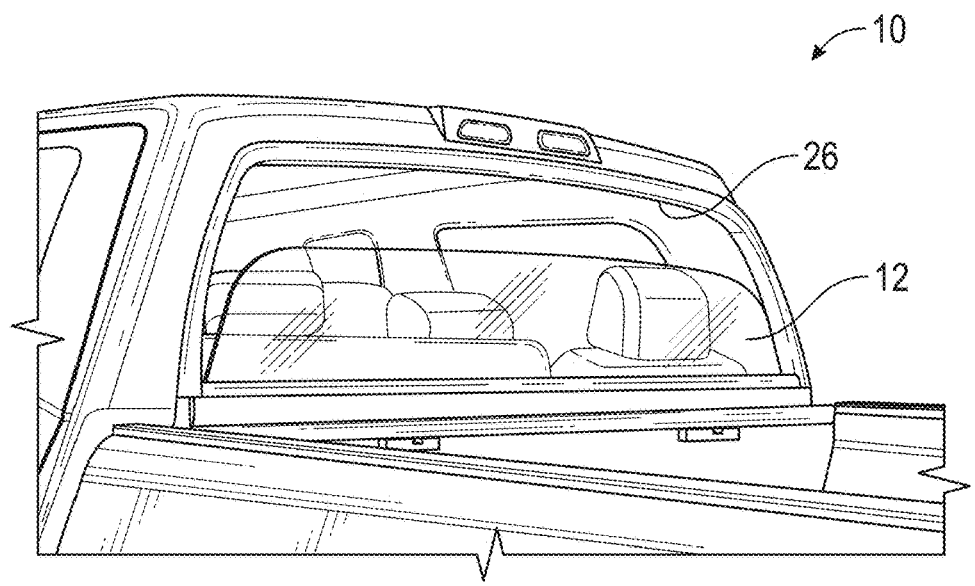
FIG. 1 is perspective view of a portion of vehicle having a movable or drop down rear window.
Figure 2:
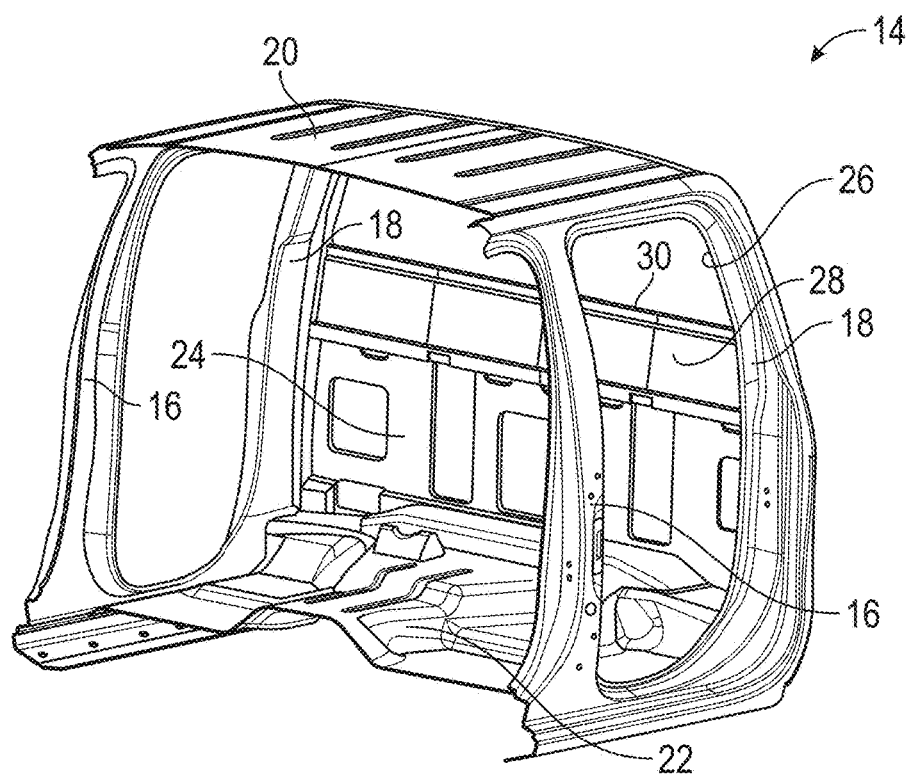
FIG. 2 is a perspective view of a body frame for a vehicle in accordance with an embodiment of the present disclosure.

Referring now to FIG. 1, a perspective view of a portion of vehicle 10 having a movable or drop down rear window 12 is illustrated. FIG. 2 is a perspective view of a body frame 14 for the vehicle 10 in accordance with an embodiment of the present disclosure. As will be discussed herein, the same body frame 14 may be used in a fixed window embodiment or a moving window embodiment without any structural changes to the body frame. In one embodiment, the body frame 14 is contemplated for use as a frame for a pickup truck that may have either a fixed rear window or a moving or dropping rear window. Body frame 14 has a pair of "B" pillars 16, which are spaced from a pair of "C" pillars 18. The "B" pillars 16 and the "C" pillars 18 extend along sides of the body frame 14. In addition, a rear wall 24 extends in a cross car direction between the "C" pillars 18. A rear window opening 26 is defined by the edges of rear wall 24, "C" pillars 18 and a roof portion 20. The body frame 14 also includes a reinforcement beam 28 that also extends in a cross car direction between the pair of "C" pillars 18. As illustrated, the reinforcement beam 28 extends from a bottom edge 30 of the rear window opening. Although the attached FIGS. illustrate a body frame 14 with "B" and "C" pillars other alternative embodiments contemplate body frame 14 with only "A" and "B" pillars (e.g., a pickup truck with only one door on each side).

Figure 3:
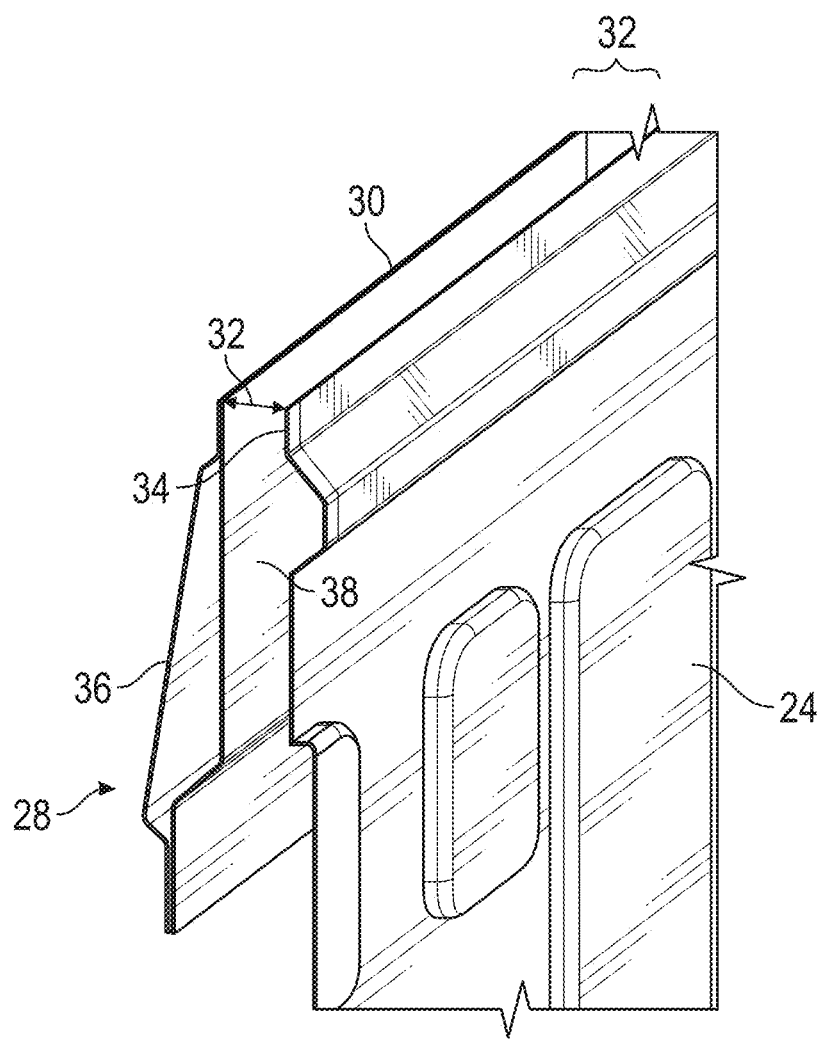
FIG. 3 is a perspective cross-sectional view of a portion of the body frame illustrated in FIG. 2.

In one embodiment and referring now to FIG. 3, the reinforcement beam 28 is located a distance 32 from an inner surface 34 of the rear wall 24. As such, distance 32 provides a gap in which the moving rear window 12 can move up and down. In one embodiment, the reinforcement beam 28 comprises an inner reinforcement 36 and an outer reinforcement 38 each of which extend in a cross car direction between the pair of "C" pillars 18. As illustrated, the reinforcement beam 28 does not extend all the way to the floor portion 22. As used herein, the inner reinforcement 36 is closer to the interior of the vehicle body frame 14 than the outer reinforcement 38. In addition, the outer reinforcement 38 is located between the rear wall 24 and the inner reinforcement 36.

Figure 4A:
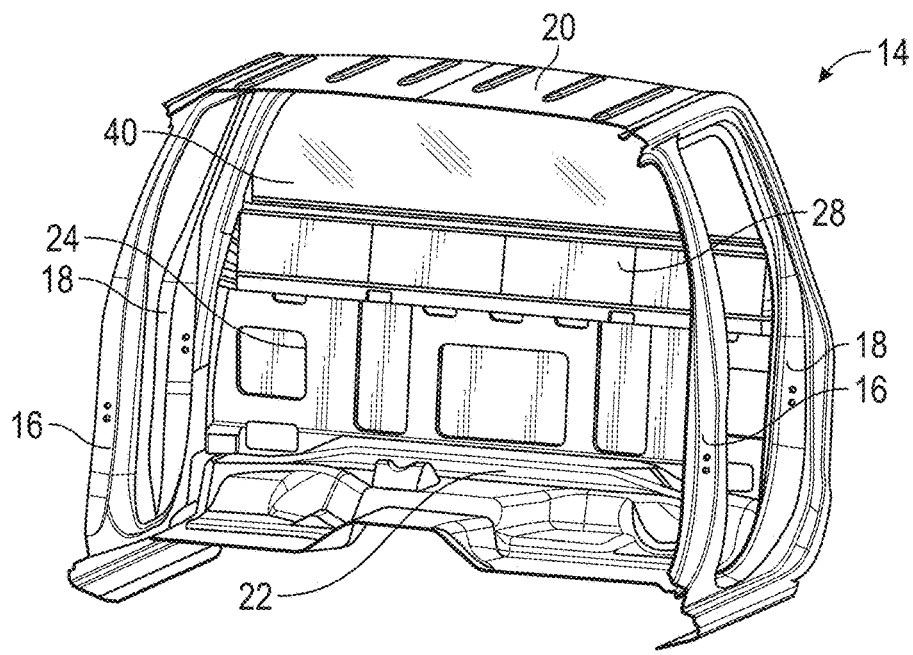
FIG. 4A is a front perspective view of the body frame illustrated in FIG. 2 with a fixed rear window.
Figure 4B:
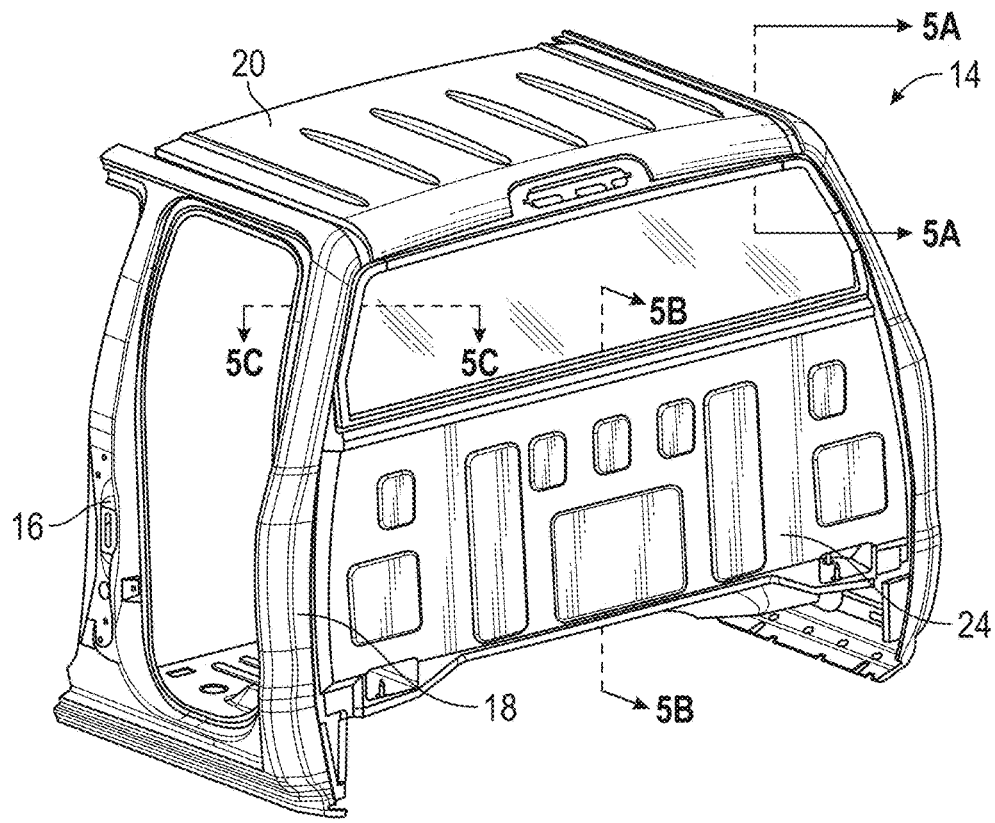
FIG. 4B is a rear perspective view of the body frame illustrated in FIG. 2 with a fixed rear window.
Figure 5A:
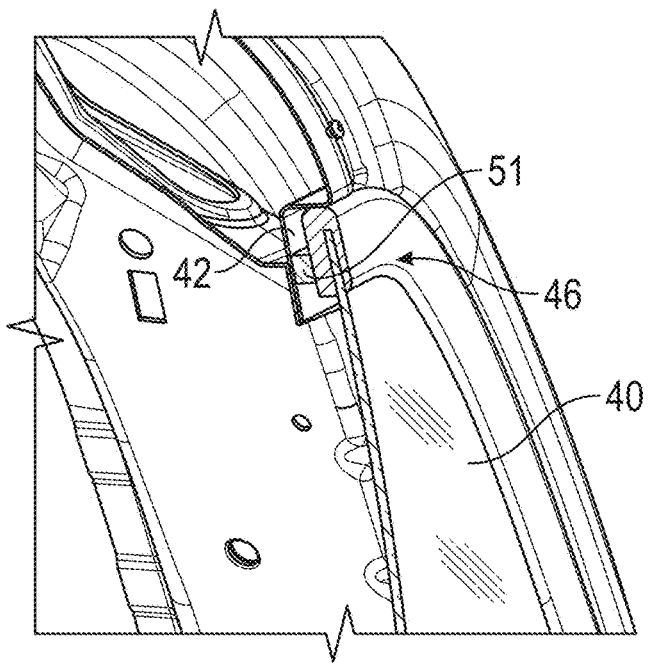
FIG. 5A is a view along lines 5A-5A of FIG. 4B.
Figure 5B:
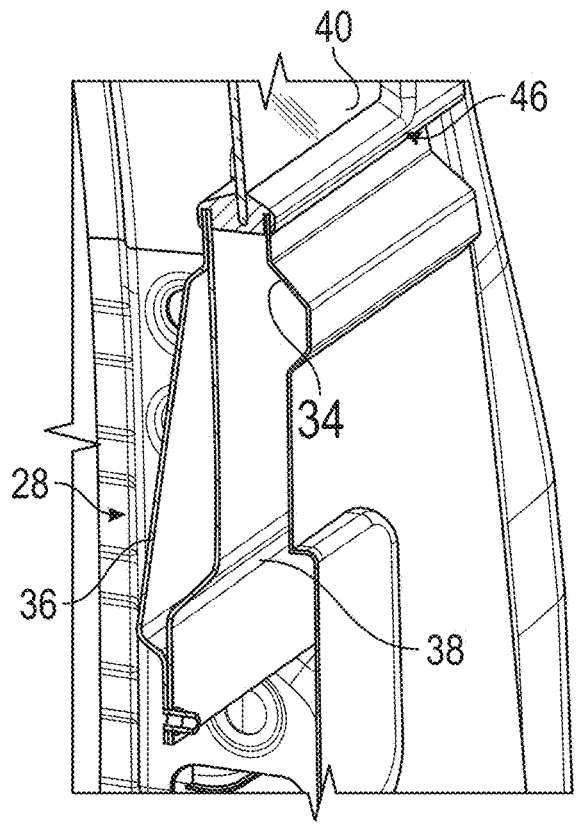
FIG. 5B is a view along lines 5B-5B of FIG. 4B.
Figure 5C:
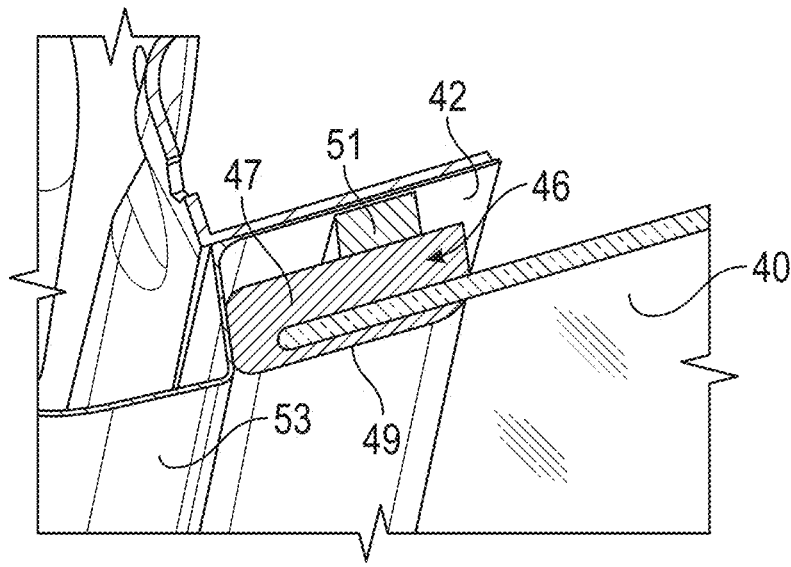
FIG. 5C view along lines 5C-5C of FIG. 4B.

FIG. 4A is a front perspective view of the body frame 14 illustrated in FIG. 2 with a fixed rear window 40 and FIG. 4B is a rear perspective view of the body frame 14 with the fixed rear window 40. FIG. 5A is a partial cross-sectional view of the body frame 14 illustrated in FIGS. 4A and 4B. As illustrated, the rear window opening 26 includes a flange or mounting recess 42 that extends along the roof portion 20 proximate to opening 26 as well as portions of the "C" pillars that form the sides of opening 26. Since the body frame 14 is used in both a fixed window embodiment and a moving window embodiment, the flange or mounting recess 42 will require a depth from a surface of the body frame 14 in order to allow for a channel or run channel and a run channel weather strip to be installed therein for the moving window embodiment. However and in a fixed window embodiment, the channel or run channel and run channel weather strip are not required. As such, the peripheral edges of the window are encapsulated with an overmolding 46. As illustrated in FIGS. 5A-5C and FIG. 6, the overmolding at the top and sides of the window 40 is thicker on an interior side or interior portion 47 than on an exterior side or exterior portion 49.

In order to secure the window 40 to the flange 42, a strip of adhesive 51 is applied to the flange 42 and the interior portion 47 of the overmolding 46. As illustrated, the thickness of the overmolding 46 (interior portion 47 and exterior portion 49) and the adhesive 51 are configured such that the exterior portion 49 is flush with an exterior surface 53 of the body frame 14 adjacent to the flange 42.

In addition, a bottom portion 48 of the overmolding 46 extends along a bottom of the window 40. Bottom portion 48 has a different configuration than the portions of the overmolding that extend along the top and sides of the window 40. Moreover, the bottom portion 48 is wide enough to traverse opening 32 and engage a top surface of rear panel 24 and reinforcement beam 28 so that fixed rear window 40 is capable of being fixedly secured to opening 26 and bottom portion 48 is wide enough to seal opening 32 that is required for the moving window embodiment.

Figure 6:
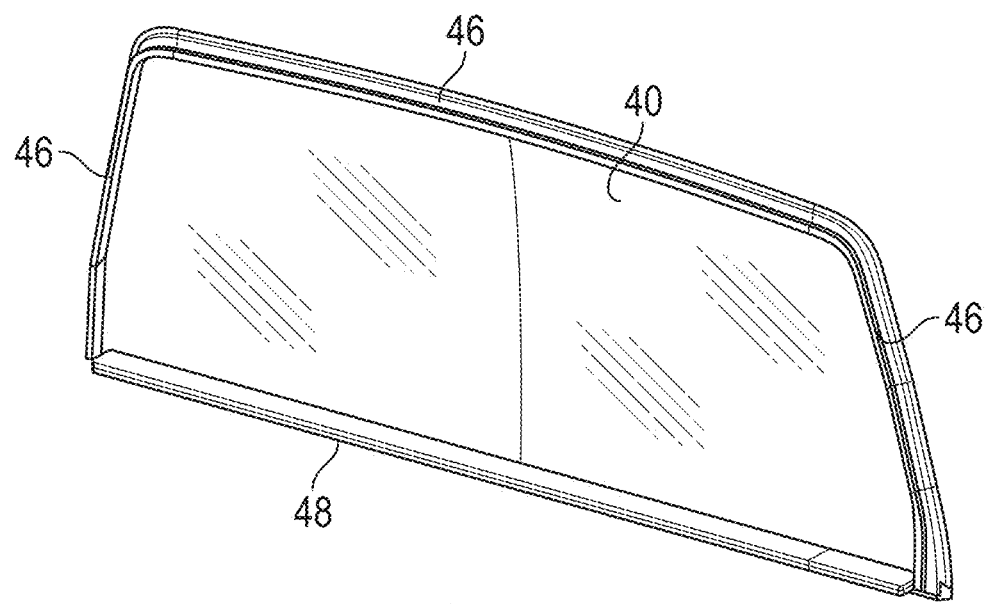
FIG. 6 is a perspective view of the rear window used in a fixed window embodiment of the present disclosure.

FIG. 6 is a perspective view of the window 40 that is installed into opening 26 in the fixed window embodiment. It is understood that the window 40 while being fixed to the opening 26 may also include movable parts such as a sliding window portion or a vented window portion.

Figure 7A:
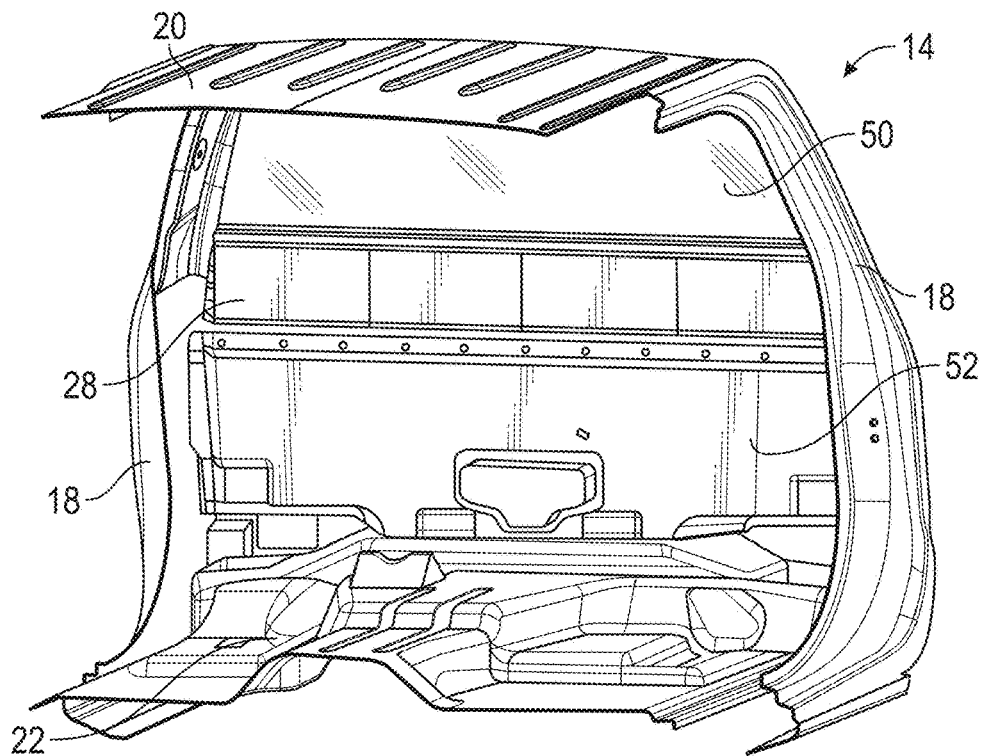
FIG. 7A is a front perspective view of the body frame illustrated in FIG. 2 with a moving or dropping rear window.
Figure 7B:
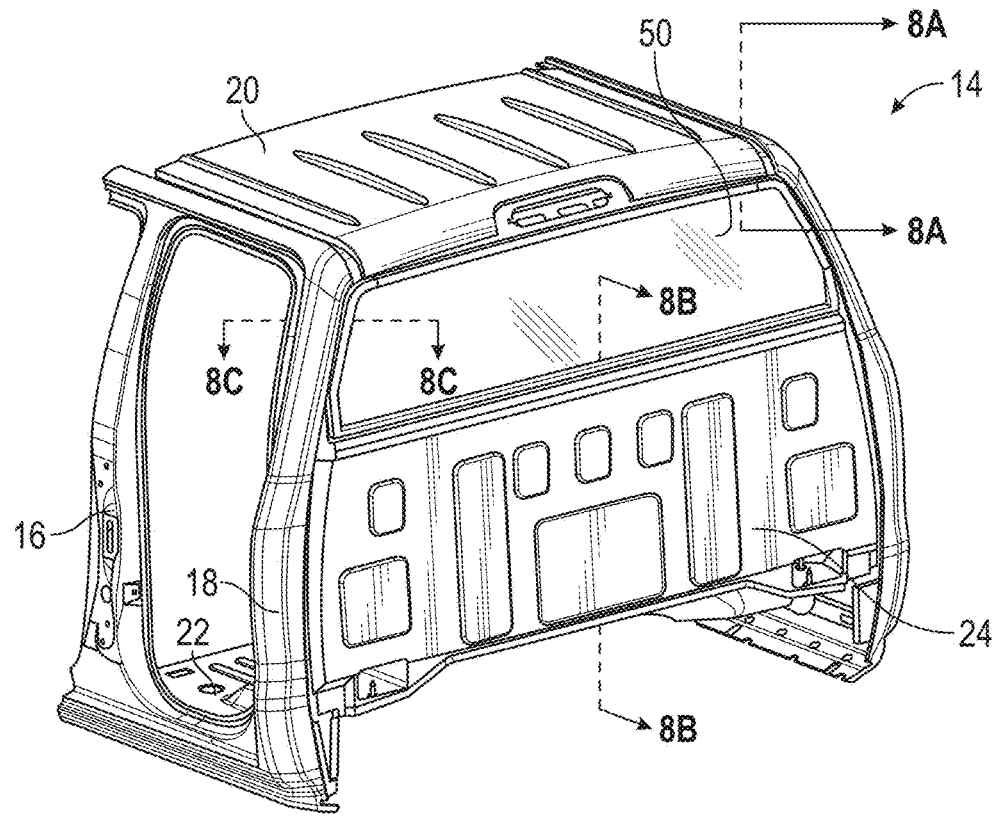
FIG. 7B is a rear perspective view of the body frame illustrated in FIG. 2 with a moving or dropping rear window.

FIG. 7A is a front perspective view of the body frame 14 illustrated in FIG. 2 with a moving or dropping rear window 50, wherein the "B" pillars 16 have been removed for illustration purposes only and FIG. 7B is a rear perspective view of the body frame 14 with the moving or dropping rear window 50. In this embodiment and in order to provide the moving or dropping rear window 50 in opening 26, a panel 52 is provided.

In one embodiment, the panel 52 is a plastic panel that carries a window regulator 54. In the illustrated embodiment, the window regulator is a dual channel window regulator 54 that is secured to an outboard side of the panel 52. Although, a dual channel window regulator is illustrated other types of window regulators are contemplated to be with the scope of various embodiments of the present disclosure (e.g., scissor lifts, single channel, etc.). In addition, the panel may be formed from other materials such as steel or metals, alloys, as opposed to plastic. As used herein, the outboard side of the panel 52 is the side that faces the rear wall 24 when the panel 52 is secured to the body frame, while the inboard side of the panel is the side that faces the inner cavity of the body frame 14. In various embodiments of the present disclosure, the inboard side of the panel may be class A or class B surface. As is known in the related arts, a class A surface is a surface that is visible to the occupant of the vehicle. In other words, a class A surface is configured to have a smooth or finished surface that is not covered when the vehicle is fully assembled. For example, the class A surface is a show surface of the vehicle, or in other words, the surfaces that you see (e.g., instrument panel, steering wheel, etc.). As such, these surfaces must be extremely smooth. Class B surfaces on the other hand, are the secondary surfaces that an occupant may sometimes see, but are not as important, such as the inside of the vehicle's glove compartment, inside of center console, etc. The class B surface must be smooth as well, however, it does not have to meet the higher standards of the class A surfaces.

Since the reinforcement beam 28 is moved inboard from the rear panel 24, the panel 52 can be secured and sealed to the outer reinforcement 38 of the reinforcement beam 28 as well as the rear wall 24. In addition, the panel may also be secured to the floor 22. Moreover and depending on the vehicle body design, the panel may alternatively be secured to the "C" pillars or any pillar that is adjacent to the rear wall 24 as well as the floor 22. As such and although one non-limiting embodiment illustrates the panel 52 being secured to the beam 28, the rear wall 24 and floor 22, other various securement locations and combinations thereof may be employed in accordance with exemplary embodiments of the present disclosure.

As illustrated in the attached FIGS., the reinforcement beam 28 has a lower flange portion 71, which may be formed by a lower portion 73 of outer reinforcement 38 and/or a lower portion 75 of the inner reinforcement 36 of the reinforcement beam 28. In addition and since the reinforcement beam 28 is moved inboard from the rear panel 24, a full inner panel is not required and the same body frame 14 can be used for a moving rear window embodiment as well as a fixed window embodiment.

Figure 8A:
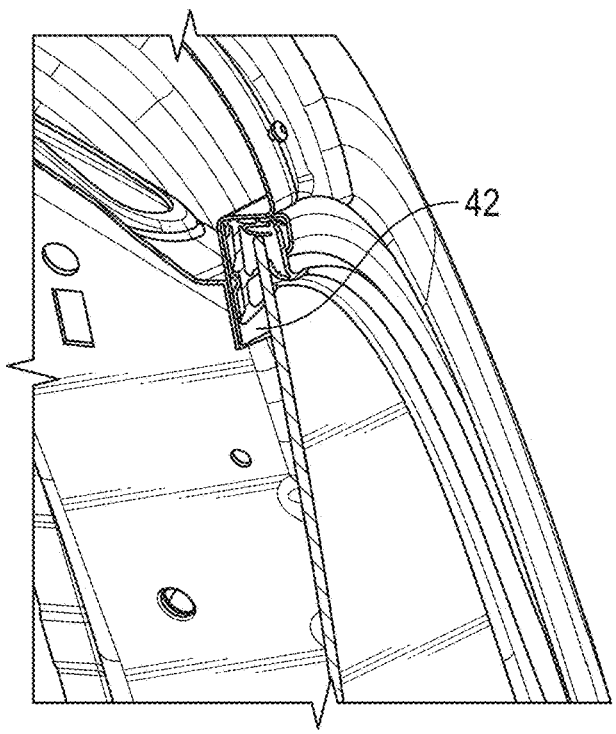
FIG. 8A is a view along lines 8A-8A of FIG. 7B.
Figure 8B:
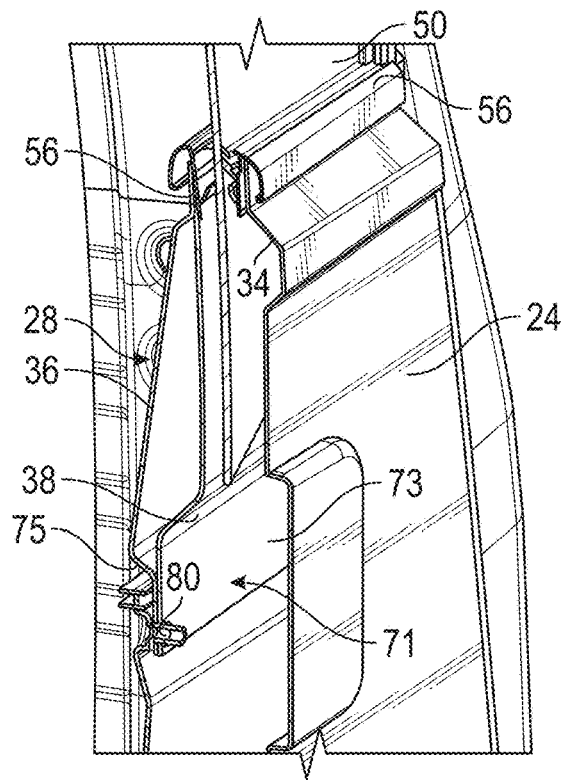
FIG. 8B is view along lines 8B-8B of FIG. 7B.
Figure 8C:
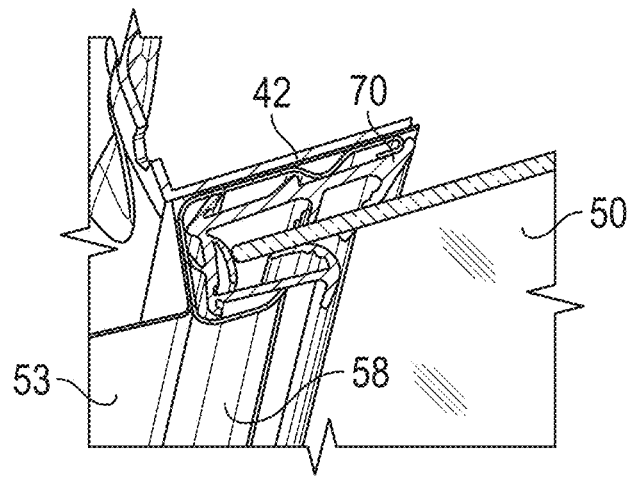
FIG. 8C is view along lines 8C-8C of FIG. 7B.
Figure 9:
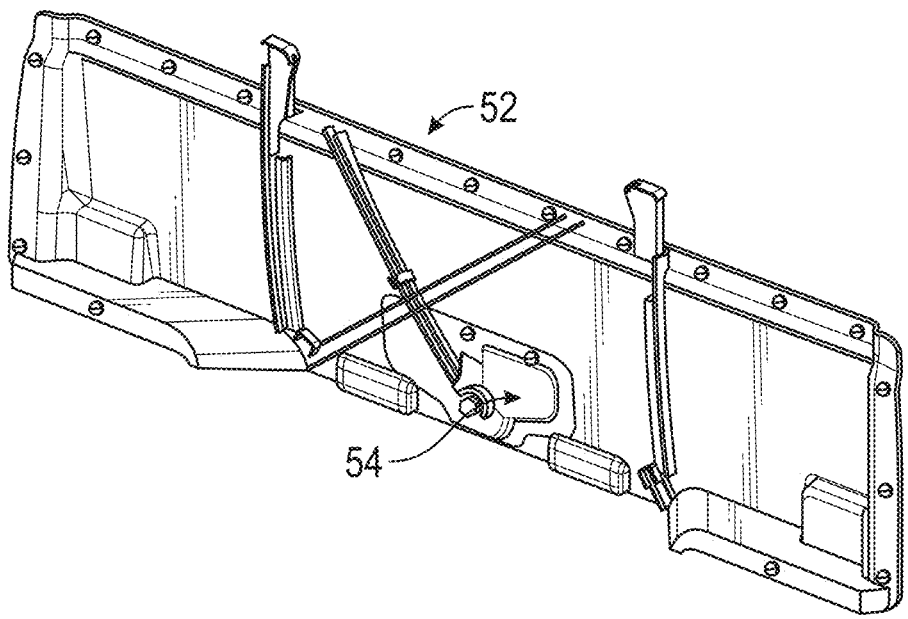
FIG. 9 is a perspective view of a panel for use in the moving rear window embodiment of the present disclosure.

FIG. 8A is a partial cross-sectional view of the body frame 14 along opening 26 proximate to the roof 20 illustrated in FIGS. 7A and 7B with the rear window 50 in a closed position and FIG. 8B is a partial cross-sectional view of the body frame 14 illustrated in FIGS. 7A and 7B along a lower portion of the opening 26 proximate to the reinforcement beam 28 and the rear wall 24 with the rear window 50 in a closed position. FIG. 8B also illustrates a pair of seals or belt seals 56 that are located on the edges of the rear panel 24 and the reinforcement beam 28 and opposite sides of opening 34. FIG. 8C is yet another partial cross-sectional view of the body frame illustrated in FIGS. 7A and 7B with the moving rear window in a closed position. In FIGS. 8A and 8C, a side channel 58 is illustrated. Side channel 58 extends along the sides and top of the opening 26. See also, FIG. 10C.

Side channel 58 is positioned on the flange 42 that extends along the "C" pillars 18 and roof 20. A run channel or weather strip 70 is inserted into the side channel 58 and is configured to slidably receive the window 50 therein. As such, the window 50 may move up and down within opening 26. In various embodiments, the window 50 may be configured to be completely received within a cavity defined between the panel 52 and rear wall 24 or only partially within the cavity defined between the panel 52 and rear wall 24.

Figure 10A:
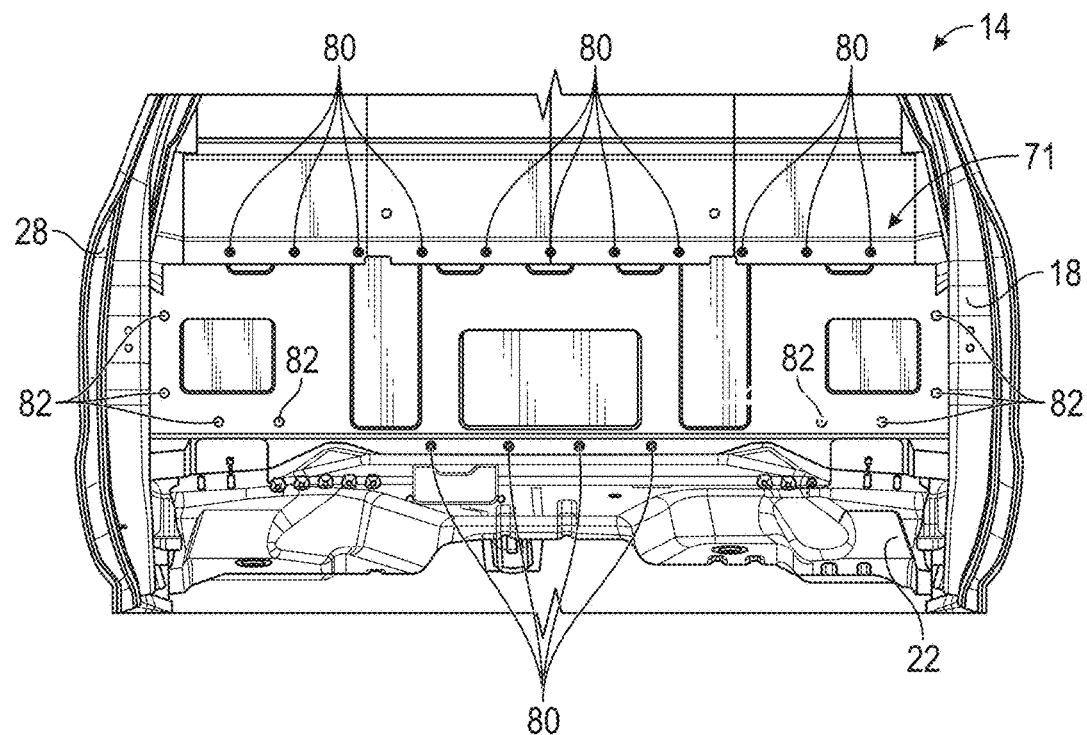
FIG. 10A is a view of the body frame illustrating points of securement for the panel in the moving rear window embodiment of the present disclosure.
Figure 10B:
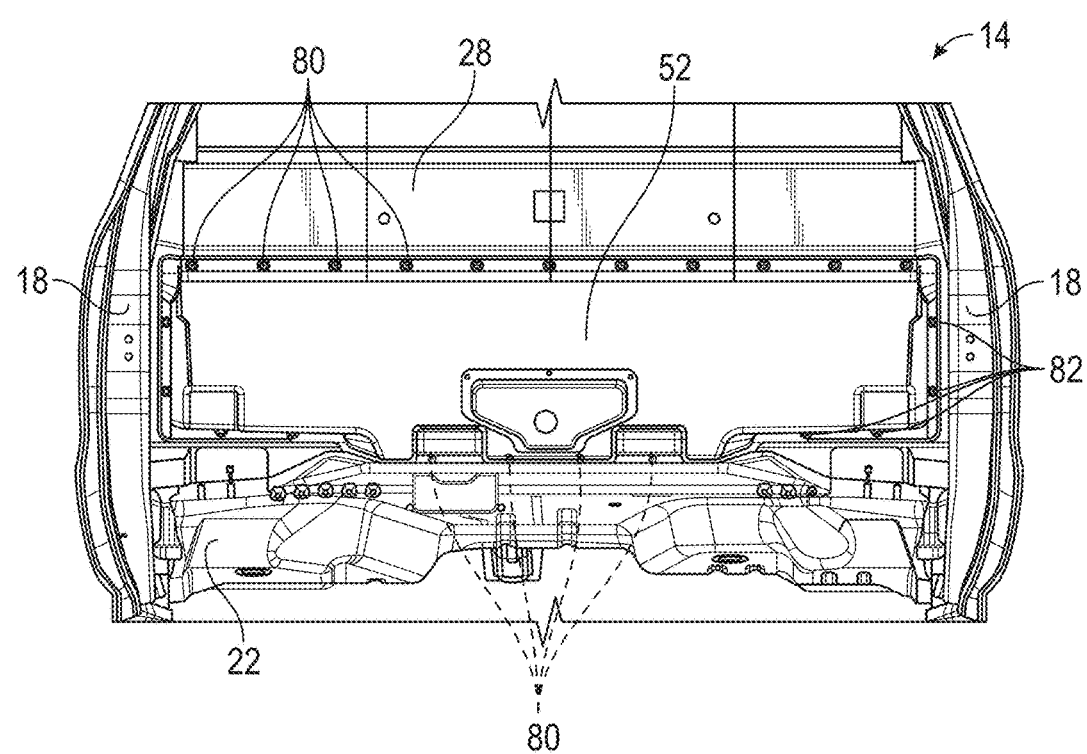
FIG. 10B is a view of the body frame with the panel in the moving rear window embodiment of the present disclosure.
Figure 10C:
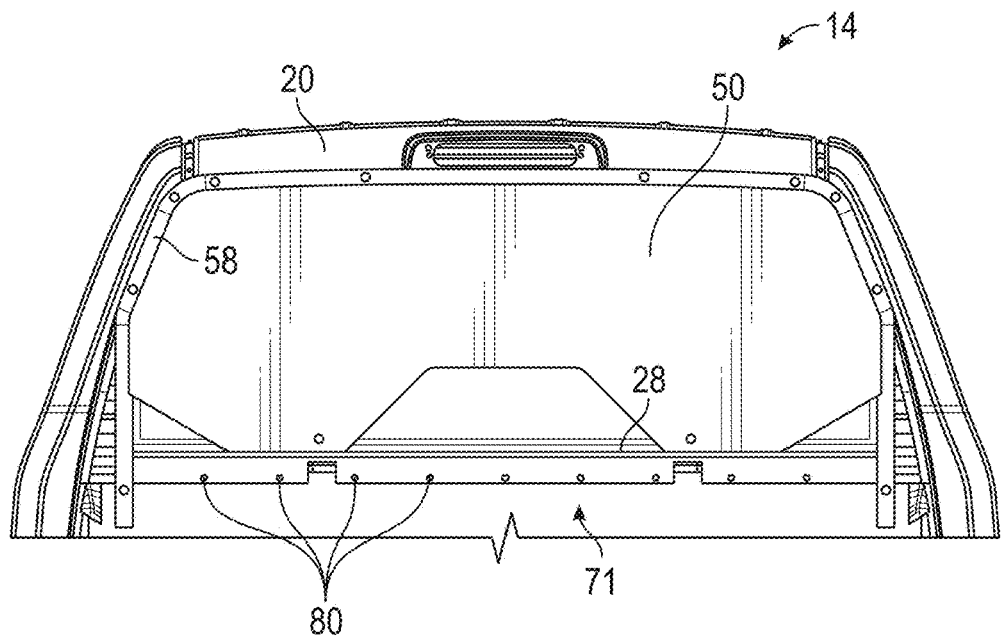
FIG. 10C is a view of the body frame with the moving rear window.

Referring now to FIGS. 10A and 10B, points of securement of the panel 52 to the body frame 14 are illustrated. As mentioned above, body frame 14 is configured for use with a fixed window 40 or a moving window 50. Regardless of whether a fixed window or moving window is installed in the body frame 14, the body frame 14 will have a plurality of openings 80 and a plurality of threaded studs 82 for use in the moving window application. In one non-limiting embodiment, the plurality of openings 80 are located in flange 71 as well as a portion of the floor 22. In addition, the plurality of threaded studs 82 are welded to the rear wall 24. Although specific locations of the openings 80 and studs 82 are illustrated it is understood that these locations are considered non-limiting locations and the locations of the openings 80 and studs 82 may be in other locations than those specifically illustrated in the attached FIGS.

In one embodiment, the openings 80 are provided for receipt of a plurality of rivet nuts therein. Accordingly and if the body frame 14 is intended for use in the moving window embodiment, a plurality of rivet nuts are secured to openings 80 in the bottom flange 71 as well as a portion of the floor 22. As is known in the related arts, a rivet nut, blind rivet nut or threaded insert, is a one-piece internally threaded and counterbored tubular rivet that can be anchored entirely from one side. One type is designed to form a bulge on the back side of the panel as a screw is tightened in its threads while another type is similarly drawn in using a screw, but it is drawn into a sleeve instead of creating a bulge. A rivet nut is also commercially available under the trademark RIVNUT®. Once the rivet nuts are secured into openings 80, fasteners may be inserted into complementary openings in the panel that align with the rivet nuts such that the panel 52 can be secured to the rear wall 24 and the floor 22 of the body frame 14. In addition, the panel 52 will have a plurality of openings that are configured to allow the studs 82 to pass therethrough as the panel 52 is secured to the body frame 14. Once the studs 82 pass through openings in the panel 52 threaded nuts may be used to engage the threaded studs 82.

In accordance with an embodiment of the present disclosure, the required studs 82 and openings 80 may be located on the reinforcement beam 28, the rear wall 24 and/or floor 22 regardless of whether the body frame 14 is being used in a fixed or moving window embodiment. This allows for the body frame 14 to be easily used in either a fixed window or moving window embodiment. For example and in the moving window embodiment, a plurality of rivet nuts are secured to openings 80 and the panel 82 is secured to the body frame 14 through fasteners and nuts that engage the rivet nuts and the threaded studs. While one means of securing the panel 52 to the body frame 14 is illustrated, numerous other types of securement means can be employed and thus, various embodiments of the present disclosure are not intended to be limited to the specific configurations illustrated herein.

FIG. 10 illustrates, the channel or run channel 58 secured to the body frame 14. In one embodiment, the channel or run channel 58 extends below the bottom of the reinforcement beam 28.

Figure 10D:
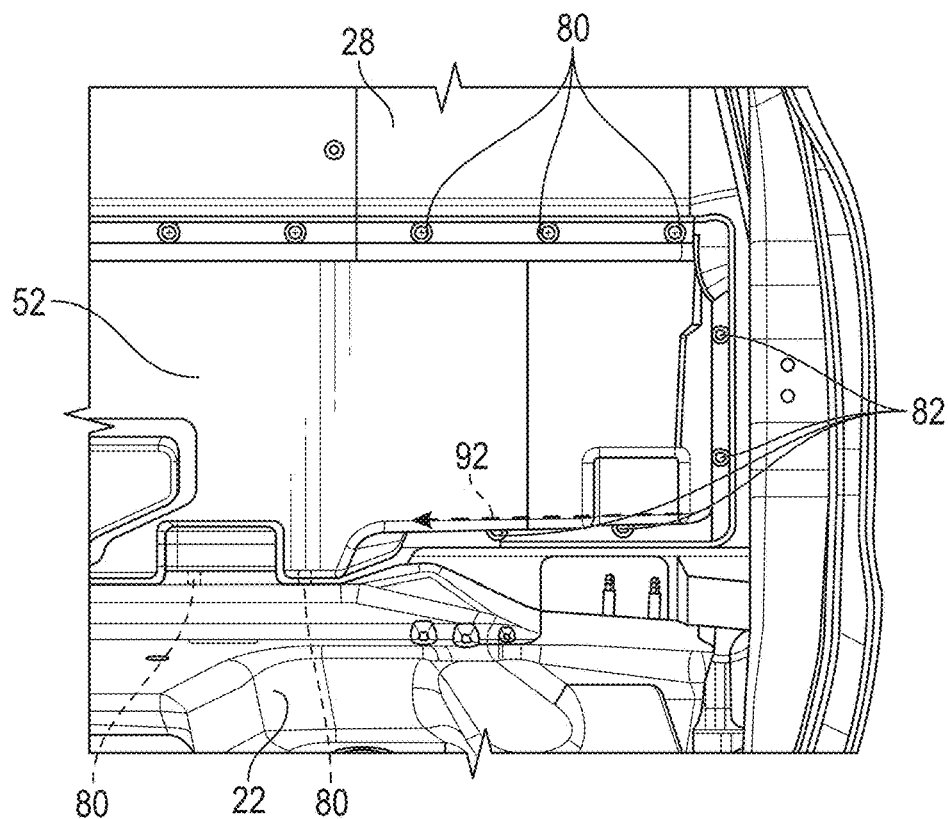
FIG. 10D is an enlarged view of the FIG. 10D.
Figure 10E:
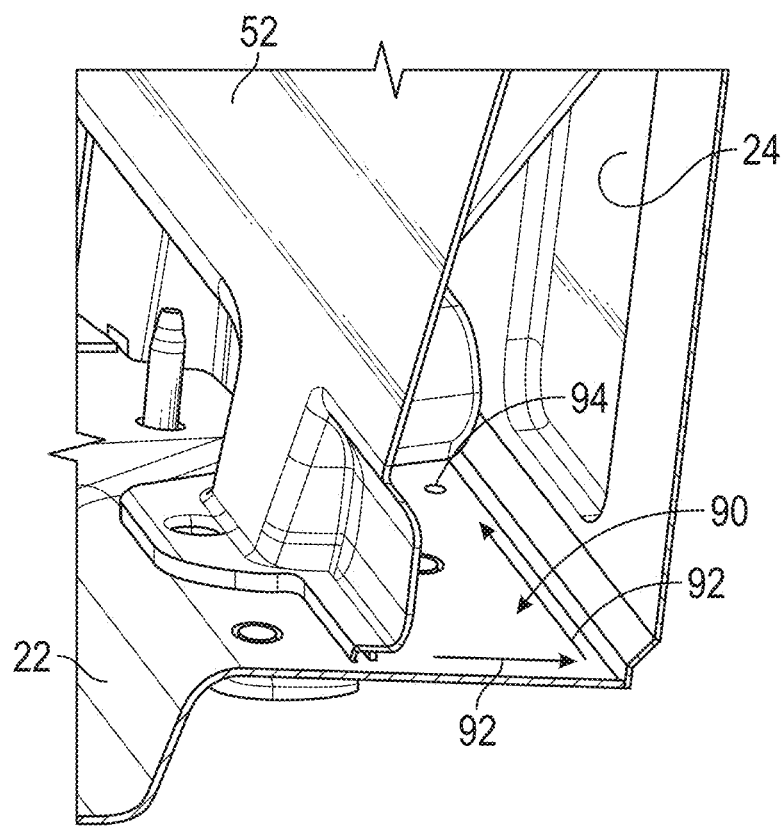
FIG. 10E is an enlarged view illustrating the panel secured to the body frame.

FIGS. 10D and 10E illustrate water flow mitigation for water that may be received in a cavity 90 disposed between panel 52 and rear wall 24. As such, water received in cavity 90 will flow in the direction of arrows 92 to drain holes 94. It is, of course, understood that FIGS. 10D and 10E illustrate one non-limiting implementation of water mitigation for water received in the cavity 90 disposed between panel 52 and rear wall 24 and as such, numerous other methods for water mitigation are contemplated to be within the scope of various embodiments of the present disclosure.

Figure 11:
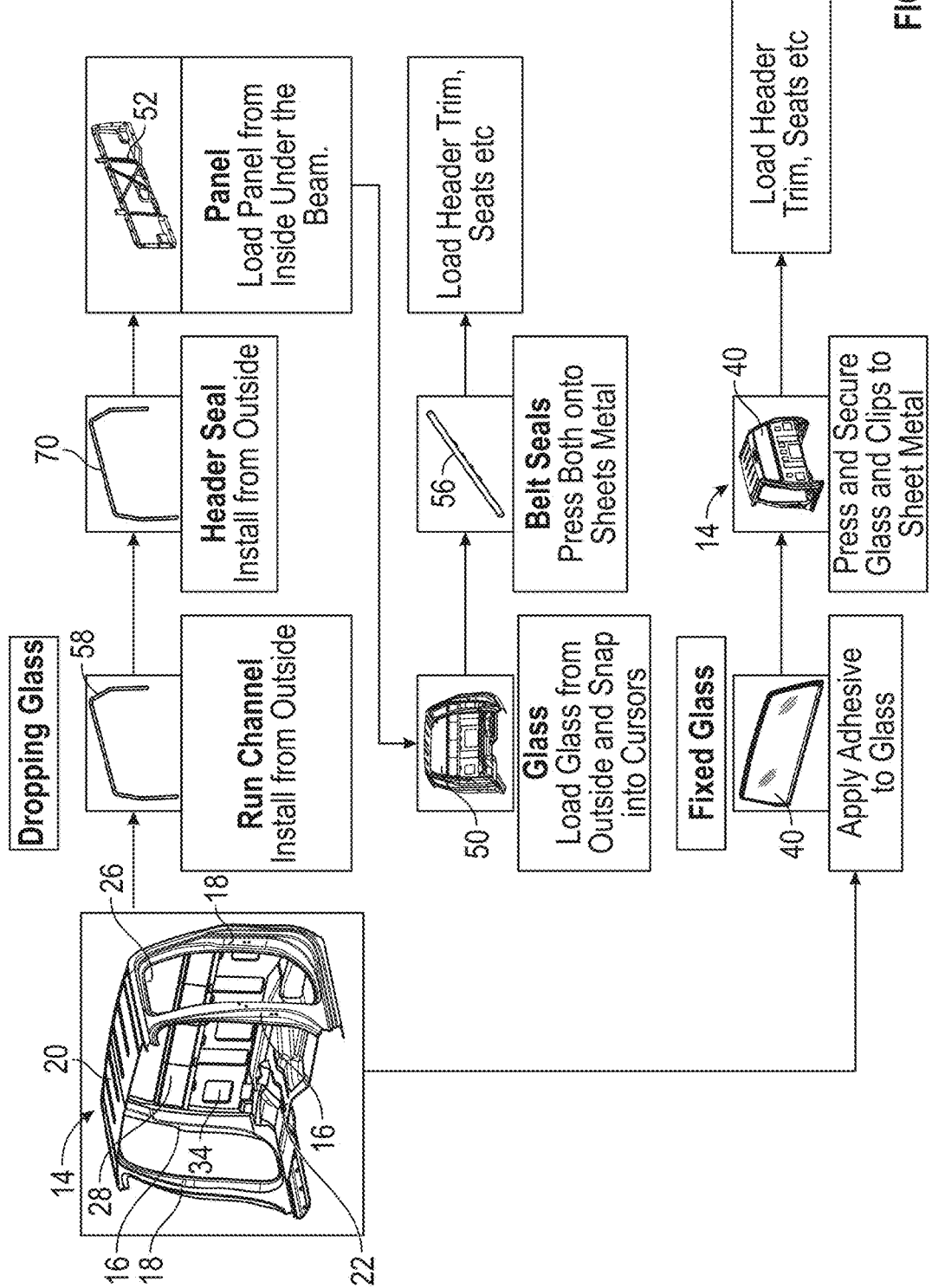
FIG. 11 is a process flow chart illustrating use of the body frame in either a fixed window embodiment or a moving window embodiment.

FIG. 11 is a process flow chart illustrating use of the body frame 14 in either a fixed window embodiment or a moving window embodiment. At a first step, the body frame 14 is provided with the reinforcement beam 28. As mentioned above, the reinforcement beam 28 is spaced from the rear panel 24. If the fixed glass 40 embodiment is desired, the fixed glass 40 has an adhesive applied thereto and the fixed glass 40 is inserted and secured into opening 26 wherein the glass 40 is secured and clipped to the sheet metal of the body frame 14. Thereafter, the header, trim and seats are installed. As mentioned above, the glass 40 is an overmolded piece of glass 40 that has an encapsulation along its peripheral edge that seals the gap 32 between the beam 28 and the sheet metal or the rear wall 24.

If however, the moving or dropping glass embodiment 50 is desired, the periphery of the opening 26 has run channels 58 installed therein as well as a run channel weather strip 70. In this embodiment, the panel 52 is secured to a flange 71 of reinforcement beam 28 as well as portions of the rear wall 24. As mentioned above, the panel 52 has a window regulator 54 for moving the window 50 up and down as is known in the related arts. Once the panel 52 is secured to the body frame 14, the window 50 is secured to the panel 52 from the outside of the body frame 14 by for example attaching the window 50 to the window regulator. Thereafter, belt seals 56 are pressed on the sheet metal of the reinforcement beam 28 and the rear wall 24. Then the header, trim and seats are installed.

In accordance with various embodiments of the present disclosure, the sheet metal of the body frame 14 is identical in the body shop and all differences (fixed window vs. moving or dropping window) are installed in the trim shop. Thus, a single body frame 14 can be used for a vehicle or pickup truck having a fixed rear window or a moving or dropping rear window.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A body frame of a vehicle, comprising:
a rear wall extending between a pair of pillars of the body frame;
a reinforcement beam that is spaced from the rear wall to define a gap, the reinforcement beam having an inner reinforcement and an outer reinforcement secured to each other, wherein the reinforcement beam extends between the pair of pillars of the body frame;
a rear window opening partially defined by the rear wall and the reinforcement beam; and
wherein the body frame is configured for use with either a fixed window or a moving window, wherein the fixed window when secured to the body frame is fixedly secured to the reinforcement beam and the rear wall and the fixed window has an overmolding located about a periphery of the fixed window and a bottom portion of the overmolding traverses the gap and wherein the moving window when secured to the body frame moves in the gap.

2. The body frame as in claim 1, wherein the pair of pillars extend along sides of the body frame.

3. The body frame as in claim 2, wherein the rear window opening is defined by edges of the rear wall, the pair of pillars and a roof portion of the body frame.

4. The body frame as in claim 3, wherein the rear window opening includes a flange that extends along the roof portion proximate to the rear window opening as well as portions of the pair of pillars that form sides of rear window opening.

5. The body frame as in claim 1, wherein the reinforcement beam does not extend all the way to a floor portion of the body frame.

6. The body frame as in claim 1, wherein a panel is secured to the reinforcement beam when the moving window is secured to the body frame.

7. The body frame as in claim 6, wherein the panel is a plastic panel that has a window regulator.

8. The body frame as in claim 7, wherein the window regulator is secured to an outboard side of the panel, wherein the outboard side of the panel faces the rear wall when the panel is secured to the reinforcement beam.

9. The body frame as in claim 8, wherein the panel has a class A surface on an inboard side of the panel, the inboard side of the panel being opposite the outboard side of the panel.

10. The body frame as in claim 1, wherein the vehicle is a pickup truck.

11. A body frame of a vehicle, comprising:
- a rear wall extending between a pair of pillars of the body frame;
- a reinforcement beam that is spaced from the rear wall to define a gap, the reinforcement beam having an inner reinforcement and an outer reinforcement secured to each other, wherein the reinforcement beam extends between the pair of pillars of the body frame;
- a rear window opening partially defined by the rear wall and the reinforcement beam;
- a panel secured to a lower portion of the reinforcement beam; and
- a moving window secured to a window regulator of the panel, wherein the moving window moves in the gap as it moves in the rear window opening.

12. The body frame as in claim 11, wherein the pair of pillars extend along sides of the body frame.

13. The body frame as in claim 11, wherein the rear window opening is defined by edges of the rear wall, the pair of pillars and a roof portion of the body frame and wherein the vehicle is a pickup truck.

14. The body frame as in claim 13, wherein the rear window opening includes a flange that extends along the roof portion proximate to the rear window opening as well as portions of the pair of pillars that form sides of rear window opening.

15. The body frame as in claim 11, wherein the reinforcement beam does not extend all the way to a floor portion of the body frame.

16. The body frame as in claim 11, wherein the panel is a plastic panel that carries the window regulator.

17. The body frame as in claim 16, wherein the window regulator is a dual channel window regulator that is secured to an outboard side of the panel.

18. The body frame as in claim 11, wherein the window regulator is secured to an outboard side of the panel, wherein the outboard side of the panel faces the rear wall when the panel is secured to the reinforcement beam and wherein the panel has a class A surface on an inboard side of the panel, the inboard side of the panel being opposite the outboard side of the panel.

* * * * *